(12) United States Patent
Matsuda

(10) Patent No.: US 10,576,688 B2
(45) Date of Patent: Mar. 3, 2020

(54) MANAGEMENT SYSTEM AND CONTROL METHOD OF 3D PRINTER

(71) Applicant: CANON KABUSHIKI KAISHA, Tokyo (JP)

(72) Inventor: Kotaro Matsuda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 305 days.

(21) Appl. No.: 15/212,729

(22) Filed: Jul. 18, 2016

(65) Prior Publication Data

US 2017/0023929 A1    Jan. 26, 2017

(30) Foreign Application Priority Data

Jul. 21, 2015    (JP) ................................ 2015-143661

(51) Int. Cl.
*B29C 64/386* (2017.01)
*B33Y 50/02* (2015.01)

(52) U.S. Cl.
CPC ............ *B29C 64/386* (2017.08); *B33Y 50/02* (2014.12); *G05B 2219/35134* (2013.01); *G05B 2219/49007* (2013.01); *Y02P 90/265* (2015.11)

(58) Field of Classification Search
CPC ..... B29C 64/386; B33Y 50/02; Y02P 90/265; G05B 2219/35134; G05B 2219/49007
USPC ............................................................. 703/6
See application file for complete search history.

(56) References Cited

U.S. PATENT DOCUMENTS

| 2014/0279177 | A1* | 9/2014 | Stump | ................ | G06Q 30/0611 |
| | | | | | 705/26.4 |
| 2015/0057784 | A1* | 2/2015 | Butler | ................. | B29C 67/0088 |
| | | | | | 700/119 |
| 2015/0170009 | A1* | 6/2015 | Cudak | ................ | G06K 15/1809 |
| | | | | | 358/1.15 |
| 2015/0331402 | A1* | 11/2015 | Lin | ..................... | G06F 17/5009 |
| | | | | | 700/119 |
| 2016/0216923 | A1* | 7/2016 | Willamowski | ........ | G06F 3/1219 |
| 2016/0236414 | A1* | 8/2016 | Reese | ................ | G05B 19/4099 |

FOREIGN PATENT DOCUMENTS

| JP | 2007-317137 A | 12/2007 |
| JP | 2013-067017 A | 4/2013 |
| JP | 2013-239161 A | 11/2013 |
| JP | 2015-060272 A | 3/2015 |

OTHER PUBLICATIONS

Mongol et al, "Rapid Prototyping: Energy and Environment in the Spotlight", 2006, Rapid Prototyping Journal, Emerald, p. 26-34 "Mongol" (Year: 2006).*
"Getting Better Prints", Apr. 17, 2015, 3DVerkstan, "Verkstan" (Year: 2015).*

* cited by examiner

*Primary Examiner* — Kamini S Shah
*Assistant Examiner* — Faraj Ayoub
(74) *Attorney, Agent, or Firm* — Canon USA, Inc., IP Division

(57) ABSTRACT

A 3D printer management application collects execution history of a job executed by a 3D printer, and generates, based on the collected execution history, a report including an actual result of use of a specific setting for control of 3D object creation and an actual result value related to productivity according to the setting.

8 Claims, 17 Drawing Sheets

SELECTION OF 3D PRINTER

[ ZYX Inc. – 3D7020 ▼ ] ~401

SELECTION OF MATERIAL

[ ABS – RED ▼ ] ~402

OUTPUT PROFILE

403~RESOLUTION
- ○ LOW (FAST)
- ● NORMAL
- ○ HIGH (SLOW)

OUTPUT SETTING

| | | |
|---|---|---|
| EXTRUDER TEMPERATURE (degrees Celsius) | 220 | ~404 |
| PRINT SPEED (mm/second) | 30 | ~405 |
| LAYER THICKNESS (mm) | 0.20 | ~406 |
| FILL DENSITY (%) | 30 | ~407 |
| FILL PATTERN | Rectilinear ▼ | ~408 |

[ OUTPUT ]  [ CANCEL ]

FEEDBACK TO OUTPUT PROFILE

SETTING TARGET PROFILE

RESOLUTION
- ○ LOW (FAST)
- ● NORMAL
- ○ HIGH (SLOW)

CHANGE OF DEFAULT VALUE

| | LAYER THICKNESS (mm) | | FILL DENSITY (%) | |
|---|---|---|---|---|
| | CURRENT SETTING VALUE 0.20 | | CURRENT SETTING VALUE 30 | |
| | CHANGE AMOUNT | AFTER CHANGE | CHANGE AMOUNT | AFTER CHANGE |
| ○ DEFENSIVE | +0.01 | 0.21 | -1 | 29 |
| ● MIDDLE | +0.02 | 0.22 | -2 | 28 |
| ○ AGGRESSIVE | +0.03 | 0.23 | -3 | 27 |

CHANGE OF FILL PATTERN OPTIONS

| ORDER | FILL PATTERN | CHANGE IN ORDER | DEFAULT OPTIONS |
|---|---|---|---|
| 1 | Line | DOWN | ○ |
| 2 | Rectilinear | UP DOWN | ● |
| 3 | Concentric | UP DOWN | ○ |
| 4 | Honeycomb | UP DOWN | ○ |
| 5 | Hilbertcurve | UP DOWN | ○ |
| 6 | Archimedeanchords | UP DOWN | ○ |
| 7 | Octagramspiral | UP | ○ |

[ SET ]  [ CANCEL ]

FIG.11

```
{
    "3d-printer-destinations": [                          ← 1100
      {
         "printer-name": "ZYX Inc. - 3D7020",             ← 1101
         "output-profiles": [                             ← 1102
           {
              "Low(Faster)": {
                 "extruder-temperature": "220 degrees Celsius",
                 "print-speed": "30 mm/second",
                 "print-layer-thickness": "0.30 mm",
                 "print-fill-density": "20%",
                 "print-fill-pattern": "Rectilinear"
              }
           },
           {
              "Standard": {
                 "extruder-temperature": "220 degrees Celsius",
                 "print-speed": "20 mm/second",
                 "print-layer-thickness": "0.20 mm",
                 "print-fill-density": "30%",
                 "print-fill-pattern": "Rectilinear"
              }
           },
           {
              "High(Slower)": {
                 "extruder-temperature": "220 degrees Celsius",
                 "print-speed": "20 mm/second",
                 "print-layer-thickness": "0.10 mm",
                 "print-fill-density": "30%",
                 "print-fill-pattern": "Honeycomb"
              }
           }
         ]
      },
      {
         "printer-name": "ZYX Inc. - 3D3030",
         "output-profiles": []
      }
    ],
    "available-fill-patterns": [                          ← 1103
       "Line",
       "Rectilinear",
       "Concentric",
       "Honeycomb",
       "Hilbertcurve",
       "Archimedeanchords",
       "Octagramspiral"
    ]
}
```

FIG.13

```
{
  "devices": [
    {
      "device-serial-id": "NNNN0001",
      "manufacturer-name": "ZYX Inc.",
      "model-name": "3D7020",
      "device-type": "3D Printer",
      "output-process-type": "FDM"
    },
    {
      "device-serial-id": "QQQQ0001",
      "manufacturer-name": "ZYX Inc.",
      "model-name": "3D3030",
      "device-type": "3D Printer",
      "output-process-type": "Ink Jet"
    {
  ]
}
```

1301 — first device entry
1302 — second device entry

FIG.14

```
{
  "device-serial-id": "NNNN0001",          ← 1401
  "job-id": "001-00000001",                ← 1402
  "job-start-datetime": "2015-04-21 14:00:11",  ← 1403
  "job-end-datetime": "2015-04-21 15:31:50",    ← 1404
  "job-name": "3D-object Tokyo Sky Tree",  ← 1405
  "print-objects": [                       ← 1406
    {
      "model-file": "3D-object Tokyo Sky Tree.STL",  ← 1406a
      "number-of-objects": "1",            ← 1406b
      "length": {                          ← 1406c
        "x-axis": "80 mm",
        "y-axis": "80 mm",
        "z-axis": "200 mm"
      }
    }
  ],
  "job-control-file-name": "3D-object Tokyo Sky Tree.gcode",  ← 1407
  "job-exit-code": {                       ← 1408
    "code": "0",
    "description": "Success."
  },
  "extruder-temperature": "220 degrees Celsius",  ← 1409
  "print-speed": "20 mm/second",           ← 1410
  "print-layer-thickness": "0.20 mm",      ← 1411
  "print-fill-density": "30%",             ← 1412
  "print-fill-pattern": "Rectilinear",     ← 1413
  "materials": [                           ← 1414
    {
      "material-name": "ZYX Inc. ABS-RED-1.75 mm",
      "material-type": "ABS",
      "material-color": "RED",
      "material-diameter": "1.75 mm",
      "material-feed-length": "4250 mm"
    },
    {
      "material-name": "ZYX Inc. ABS-BLUE-1.75 mm",
      "material-type": "ABS",
      "material-color": "BLUE",
      "material-diameter": "1.75 mm",
      "material-feed-length": "3391 mm"
    }
  ],
  "power-consumption": "12.1 kWh"          ← 1415
}
```

FIG.15

```
{
    "usage-reports": [
        {
            "device-serial-id": "NNNN0001",
            "manufacturer-name": "ZYX Inc.",
            "model-name": "3D7020",
            "usage-report": [
                {
                    "year-month": "2015-04",
                    "average-layer-thickness": "0.19 mm",
                    "average-fill-density": "45.2%",
                    "used-fill-patterns": [
                        {
                            "Line": "15%"
                        },
                        {
                            "Rectilinear": "30%"
                        },
                        {
                            "Concentric": "5%"
                        },
                        {
                            "Honeycomb": "30%"
                        },
                        {
                            "Hilbertcurve": "10%"
                        },
                        {
                            "Archimedeanchords": "5%"
                        },
                        {
                            "Octagramspiral": "5%"
                        }
                    ],
                    "results": {
                        "number-of-output-objects": {
                            "total": "102"
                        },
                        "output-time": {
                            "total": "12,495 minutes",
                            "average": "122.5 minutes"
                        },
                        "consumed-material-volume": {
                            "total": "14,800 cm3",
                            "average": "139.2 cm3"
                        },
                        "power-consumption": {
                            "total": "3,668 kWh",
                            "average": "35.6 kWh"
                        }
                    }
                }
            ]
        },
        {
            "device-serial-id": "QQQQ0001",
            "usage-report": []
        }
    ]
}
```

FIG.16

```
{
    "device-serial-id": "NNNN0001",
    "job-id": "001-00000099",
    "job-start-datetime": "2015-04-07 11:22:34",
    "job-end-datetime": "2015-04-07 13:33:12",
    "job-name": "Multiple Objects Job[1]",
    "print-objects": [
        {                                              ← 1601
            "model-file": "3D-object Tokyo Sky Tree.STL",
            "number-of-objects": "2",                  ← 1603
            "length": {
                "x-axis": "80 mm",
                "y-axis": "80 mm",
                "z-axis": "200 mm"
            }
        },
        {                                              ← 1602
            "model-file": "3D-object Effel Tower.STL",
            "number-of-objects": "1",
            "length": {
                "x-axis": "70 mm",
                "y-axis": "70 mm",
                "z-axis": "160 mm"
            }
        }
    ],
    "job-control-file-name": "Multiple Objects Job[1].gcode",
    "job-exit-code": {
        "code": "0",
        "description": "Success."
    },
    "extruder-temperature": "220 degrees Celsius",
    "print-speed": "20 mm/second",
    "print-layer-thickness": "0.20 mm",
    "print-fill-pattern": "Rectilinear",
    "print-fill-density": "30%",
    "print-fill-thickness": "0.20 mm",
    "materials": [
        {
            "material-name": "ZYX Inc. ABS-RED-1.75 mm",
            "material-type": "ABS",
            "material-color": "RED",
            "material-diameter": "1.75 mm",
            "material-feed-length": "4250 mm"
        },
        {
            "material-name": "ZYX Inc. ABS-BLUE-1.75 mm",
            "material-type": "ABS",
            "material-color": "BLUE",
            "material-diameter": "1.75 mm",
            "material-feed-length": "3391 mm"
        }
    ],
    "power-consumption": "55.9 kWh"
}
```

FIG. 17

```
}
    "device-serial-id": "NNNN0001",
    "usage-report": [
        {
            "year-month-date": "2015-04-07",
            "jobs": [
                {
                    "job-start-datetime": "2015-04-07 09:10:34",
                    "job-end-datetime": "2015-04-07 11:01:11",
                    "job-name": "Obj[1]",
                    "print-objects": [
                        {
                            "model-file": "Obj[1].STL",
                            "number-of-objects": "1"
                        }
                    ]
                },
                {
                    "job-start-datetime": "2015-04-07 12:12:34",
                    "job-end-datetime": "2015-04-07 13:50:22",
                    "job-name": "Obj[2]Obj[3]",
                    "print-objects": [
                        {
                            "model-file": "Obj[2].STL",
                            "number-of-objects": "1"
                        },
                        {
                            "model-file": "Obj[3].STL",
                            "number-of-objects": "1"
                        }
                    ]
                },
                {
                    "job-start-datetime": "2015-04-07 13:58:00",
                    "job-end-datetime": "2015-04-07 15:20:11",
                    "job-name": "Obj[4]",
                    "print-objects": [
                        {
                            "model-file": "Obj[4].STL",
                            "number-of-objects": "1"
                        }
                    ]
                },
                {
                    "job-start-datetime": "2015-04-07 15:40:20",
                    "job-end-datetime": "2015-04-07 17:09:21",
                    "job-name": "Obj[5]",
                    "print-objects": [
                        {
                            "model-file": "Obj[5].STL",
                            "number-of-objects": "1"
                        }
                    ]
                }
            ],
            "number-of-output-objects": {
                "total": "5",
                "applied-multiple-objects": "2"
            },
            "power-consumption": {
                "total": "27.5 kWh",
                "average": "5.5 kWh"
            }
        }
    ]
}
```

1701 → "jobs"
1702 → "print-objects"
1703 → "total": "5"
1704 → "applied-multiple-objects": "2"
1705 → "total": "27.5 kWh"
1706 → "average": "5.5 kWh"

MANAGEMENT SYSTEM AND CONTROL METHOD OF 3D PRINTER

BACKGROUND OF THE INVENTION

Field of the Invention

The present disclosure generally relates to management and control and, more particularly, to a management system, a control method, and to a technique for managing a three-dimensional (3D) printer that creates a three-dimensional object.

Description of the Related Art

In recent years, 3D printers have become rapidly widespread. The term "3D printer" is a general term for a control apparatus that creates a 3D object based on special model data. A technique for creating the 3D object is also referred to as additive manufacturing. In contrast, a two-dimensional (2D) printer represents a printing machine for printing an image, for example, on paper (a sheet) in a planar manner.

The 3D printers have been already in practical use. However, the 3D printers have been used only in certain kinds of industry or for certain purposes due to their large size, handling difficulty, and necessity of a dedicated and/or special facility or material.

Meanwhile, with recent technological advancement in the field of 3D printers, various creation methods have been proposed and/or practically used, and the number of 3D printers employing fused deposition modeling (FDM) among the various creation methods is rapidly increasing. Such a 3D printer is less expensive and readily operable by general consumers.

Moreover, commercial 3D printers with various creation methods, functions, and/or performance capabilities for manufacturers and companies in various industries have been practically used. The commercial 3D printer has been used for various applications including production of a prototype and a product component, and has been rapidly widespread.

On the other hand, in the field of related-art 2D printers, there are various applications for managing and/or operating such printers.

There are printer management applications that report a running cost and/or an environment load of an office printer. The printer management applications can compare cases where a print setting such as two-side printing and an N in 1 page layout is applied or not applied, so that a cost saving effect or a resource saving effect can be reported and/or simulated.

Japanese Patent Application Laid-Open No. 2007-317137 discusses a method for simulating a saving effect by changing a setting of printer function restriction such as prohibition of one-side, color, and/or 1 in 1 printing.

The 3D printer consumes a longer output time per job (e.g., tens of minutes to several hours) than the 2D printer. In general, 3D printers for companies (commercial 3D printers) are capable of outputting a prototype and a product with higher performance and/or higher accuracy, and are more expensive than those for general consumers. Hence, the commercial 3D printer is generally introduced to one department within a company.

Similar to the 2D printer, the 3D printer is expected to report saving effects of costs, electricity, and/or consumable goods according to a change in output setting item.

However, since the 3D printer has the above-described characteristics in which the number of 3D printers is smaller than that of 2D printers and an output time of the 3D printer is longer than that of the 2D printer, an appealing item of the 3D printer as a saving effect should differ from that of the 2D printer. For example, if the appeal of the 3D printer is output-time saving, items such as a change in the number of units produced per day and a change in output time of the 3D printer, that is, a change in operation hours, need to be reported.

Moreover, output settings that can be set to the 3D printer differ from those settable to the 2D printer, and result data that can be acquired from the 3D printer differs from that acquirable from the 2D printer.

For example, attributes that can be set to output settings of the 2D printer include a one-side/two-side printing, an N in 1 page layout, and a color/monochrome printing.

On the other hand, attributes that can be set to output settings of the 3D printer include a material type, material color, a creation speed, a nozzle temperature, a lamination pitch, and a fill density.

The result data that can be acquired from the 2D printer includes sheet size, color/monochrome printing, and the number of printed sheets.

On the other hand, the result data which can be acquired from the 3D printer includes a material use amount and an output time in addition to the material type, the material color, the creation speed, the nozzle temperature, the lamination pitch, and the fill density.

The technique discussed in Japanese Patent Application Laid-Open No. 2007-317137 is for managing and/or controlling the 2D printer. Such technique does not allow a saving effect to be output and/or displayed in consideration of the above-described characteristics of the 3D printer and/or the above-described differences between the 3D printer and the 2D printer. Consequently, such technique cannot be used to manage the 3D printer.

SUMMARY OF THE INVENTION

According to an aspect of the present disclosure, a management system for managing a control apparatus configured to execute a job for creating a 3D object by a creation device, includes a collection unit configured to collect execution history of the job executed by the control apparatus, and a generation unit configured, based on the collected execution history, to generate a report including an actual result of use of a specific setting for control of 3D object creation and an actual result value relating to productivity according to the setting.

Further features of the present disclosure will become apparent from the following description of exemplary embodiments with reference to the attached drawings.

BRIEF DESCRIPTION OF THE DRAWINGS

FIG. 4 is a diagram illustrating a three-dimensional (3D) printer output setting screen.

FIG. 8 is a diagram illustrating a feedback screen to an output profile of a 3D printer output setting.

FIG. 11 is a diagram illustrating an example of output setting information in a Java (registered trademark) script object notation (JSON) format.

FIG. 13 is a diagram illustrating an example of a device list in the JSON format.

FIG. 14 is a diagram illustrating an example of one record of job history data in the JSON format.

FIG. 15 is a diagram illustrating an example of a use state report in the JSON format.

FIG. 16 is a diagram illustrating an example of one record of job history data in the JSON format in a case where a plurality of objects is arranged.

FIG. 17 is a diagram illustrating an example of an actual result value in the JSON format.

DESCRIPTION OF THE EMBODIMENTS

Exemplary embodiments of the present disclosure will be described below with reference to the drawings.

Figure 1:
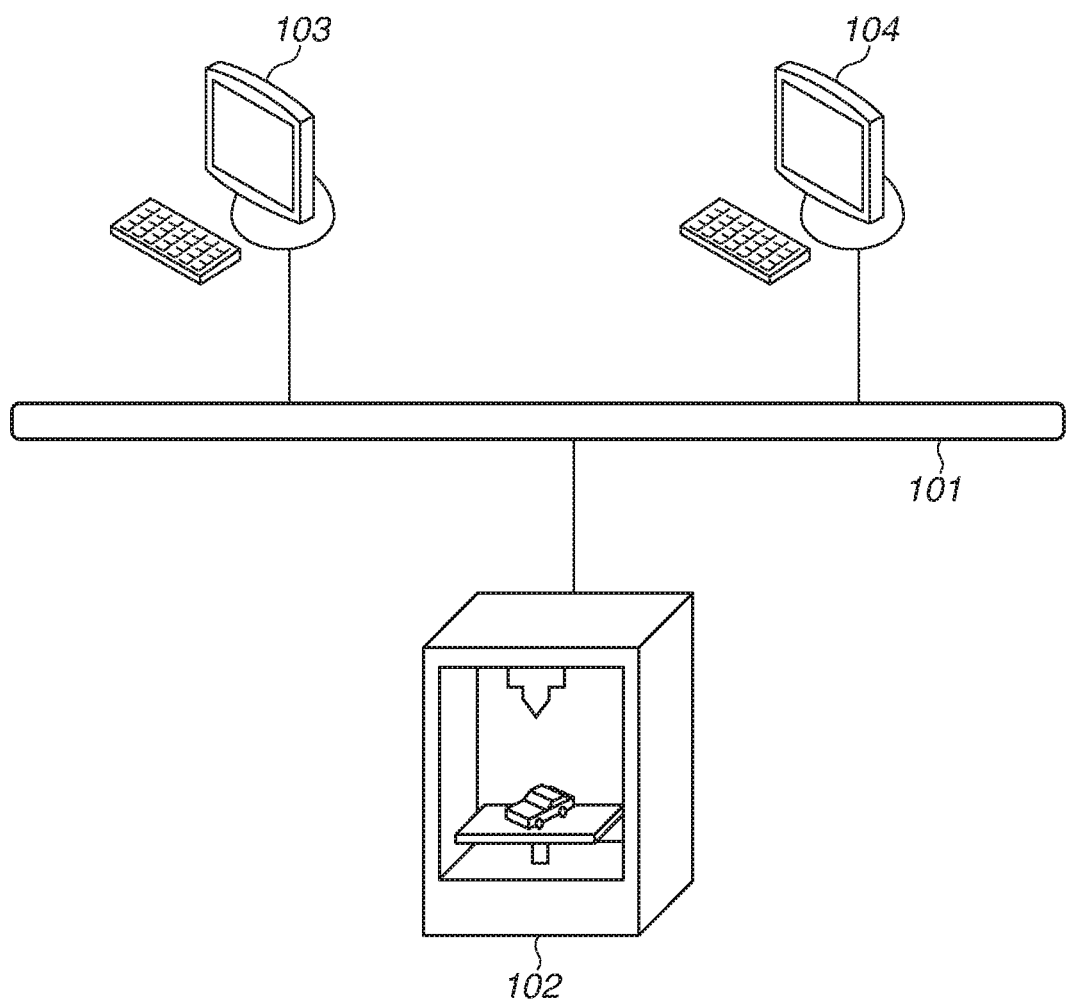
FIG. 1 is a schematic diagram illustrating a configuration of a system to which a management system according to an exemplary embodiment of the present disclosure can be applied.

FIG. 1 is a diagram illustrating an example of a network configuration of a system to which a management system according to an exemplary embodiment of the present disclosure can be applied.

The system includes a network 101 such as the intranet or a local area network (LAN). Moreover, the system includes a 3D printer 102 and computers 103 and 104. The 3D printer 102 serves as an example of a control apparatus that creates a solid (a 3D object) based on special model data. Each of the computers 103 and 104 is, for example, a personal computer (PC), a tablet computer, or a smart phone.

The 3D printer 102 and the computers 103 and 104 can mutually transmit and receive information via the network 101. The network 101 can be a wireless network such as a wireless LAN. Alternatively, the network 101 can be a public network such as the Internet as long as information can be transmitted and received.

Figure 2:
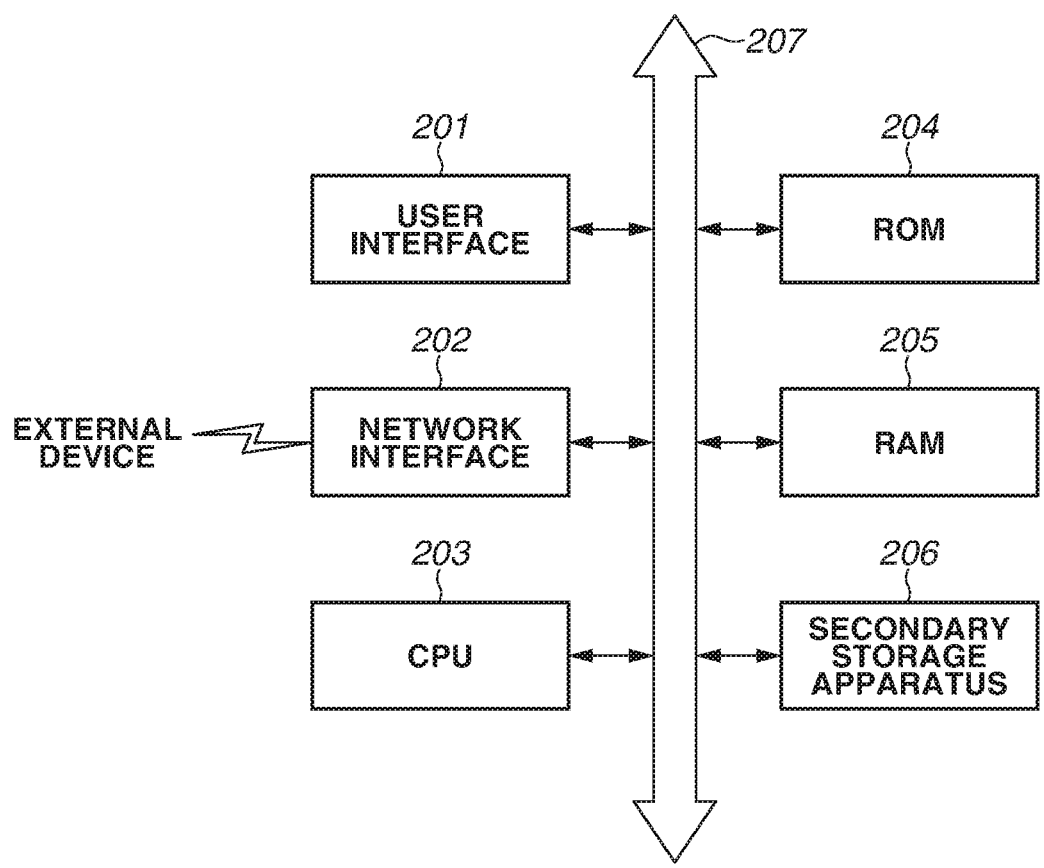
FIG. 2 is a block diagram illustrating a configuration of information processing function hardware of an apparatus included in the system.

FIG. 2 is a diagram illustrating an example of a module configuration of information processing functions in each of the 3D printer 102, the computer 103, and the computer 104. As for the 3D printer 102, a controller unit 312 described below with reference to FIG. 3 corresponds to the configuration illustrated in FIG. 2.

Each of the computer 103, the computer 104, and the controller unit 312 of the 3D printer 102 includes a user interface 201, a network interface 202, a central processing unit (CPU) 203, a read only memory (ROM) 204, a random access memory (RAM) 205, and a secondary storage apparatus 206. The user interface 201 inputs and outputs information and signals by using hardware such as a display, a keyboard, a mouse, a touch panel, and a button. In a case where the computer does not include such hardware, a remote desktop or a remote shell can be used. In such a case, the computer is connected and/or operated from another computer via a network. As used herein, the term "unit" generally refers to any combination of software, firmware, hardware, or other component, such as circuitry, that is used to effectuate a purpose.

The network interface 202 is connected to a network such as a LAN to communicate with other computers and network devices. The ROM 204 stores a built-in program and data. The RAM 205 serves a temporary memory area. The secondary storage apparatus 206 is, for example, a hard disk drive (HDD) and a flash memory. The CPU 203, which may include one or more processors and one or more memories, executes a program read from a memory such as the ROM 204, the RAM 205, and the secondary storage apparatus 206. Each of these units 201 through 206 is connected via an input output interface 207.

Hereinafter, processing for outputting a use state report by a 3D printer management application is described with reference to FIGS. 3, 4, and 5.

Figure 3:
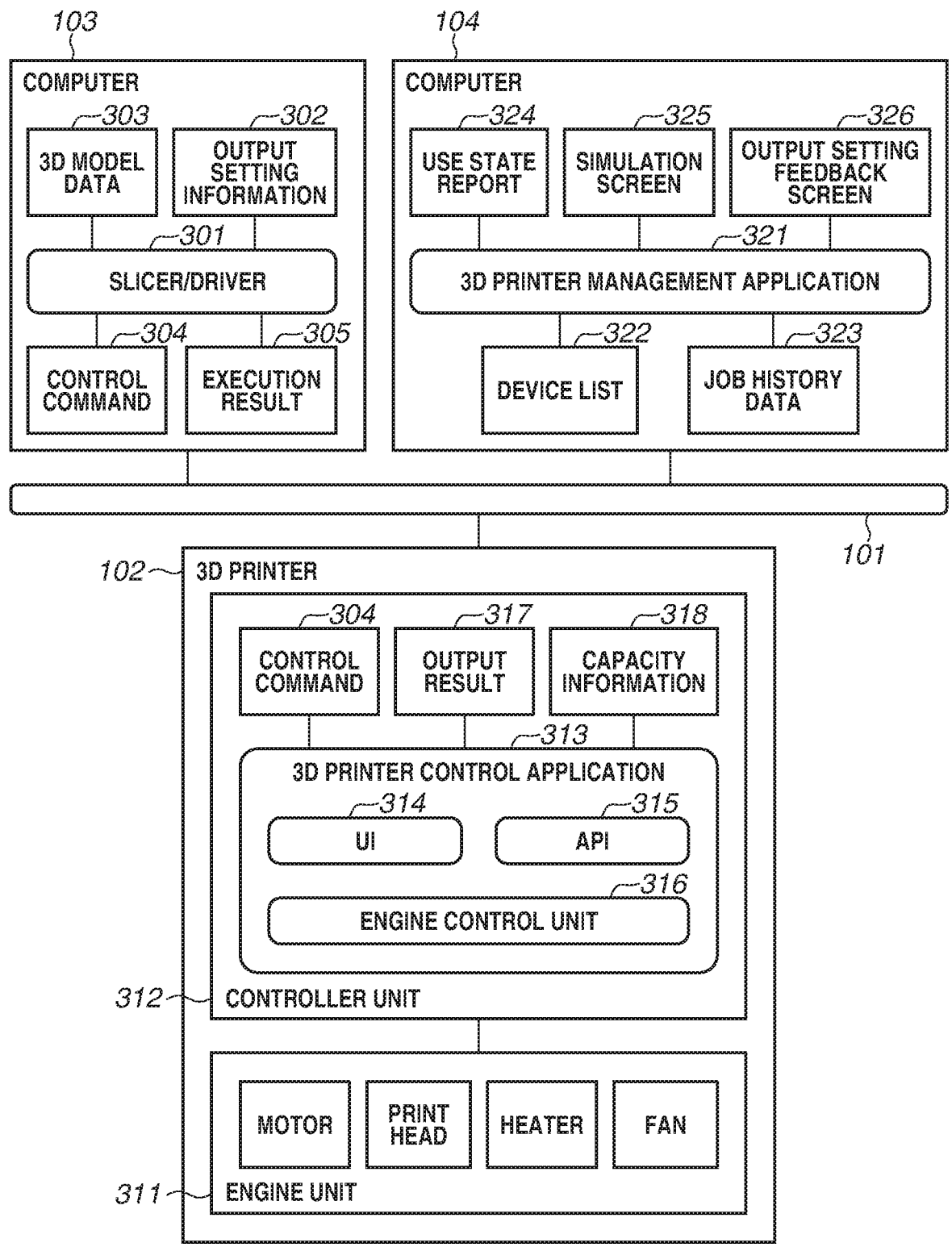
FIG. 3 is a block diagram illustrating a configuration of software included in the system.

FIG. 3 is a diagram illustrating an example of a software configuration (the configuration partly including hardware) in the management system according to the present exemplary embodiment.

First, a configuration of the computer 103 is described. The computer 103 includes a slicer/driver 301, output setting information 302, 3D model data 303, a control command 304, and an execution result 305.

The slicer/driver 301 is installed in and executed by the computer 103. The slicer/driver 301 is software called a slicer or a driver. In other words, the slicer/driver 301 is mounted as software in the computer 103, and functions when the CPU 203 of the computer 103 executes a program stored in the secondary storage apparatus 206.

The output setting information 302 is used to set an output setting of the slicer/driver 301. An example of the output setting information 302 is described below with reference to FIG. 11.

An example of the 3D model data 303 is data in a STereoLithography (STL) format that is a file format by which data expressing 3D shape is stored.

For the control command 304 for the 3D printer, for example, a G-code of a machine tool command expanded for 3D printer is often used. The slicer/driver 301 converts the 3D model data 303 into the control command 304 based on a setting value selected from the output setting information 302.

The execution result 305 represents a result of the processing executed by the slicer/driver 301.

Hereinafter, a 3D printer output setting operation performed by the slicer/driver 301 is described with reference to FIGS. 4 and 11.

FIG. 4 is a diagram illustrating an example of a 3D printer output setting screen 400.

FIG. 11 is a diagram illustrating an example of the output setting information 302 in a Java (registered trademark) script object notation (JSON) format.

In FIG. 4, the 3D printer output setting screen 400 includes drop-down boxes 401 and 402, and a radio button 403. The 3D printer output setting screen 400 is provided in the slicer/driver 301, and is displayed on, for example, the user interface 201 of the computer 103 by the slicer/driver 301 according to an instruction from the user interface 201 of the computer 103.

The drop-down box 401 is used to select a 3D printer of an output destination. The drop-down box 401 corresponds to "printer name" 1101 of an array "3d-printer-destinations" 1100 in the JSON data illustrated in FIG. 11. The drop-down box 402 is used to select a material.

The radio button 403 is used to select an output profile. The radio button 403 corresponds to an array "output-profiles" 1102 in the JSON data illustrated in FIG. 11. Moreover, the 3D printer output setting screen 400 includes up-down boxes 404, 405, 406, 407, and 408 that are used to respectively set an extruder temperature, a print speed, a layer thickness (a lamination pitch), a fill density, and a fill pattern. The up-down boxes 404 through 408 correspond to respective attributes inside the array "output-profiles" 1102 in the JSON data illustrated in FIG. 11. More specifically, the up-down box 404 corresponds to "extruder-temperature". The up-down boxes 405, 406, and 407 respectively correspond to "print-speed", "print-layer-thickness", and "print-fill-density. The up-down box 408 corresponds to "print-fill-pattern".

Selectable candidates for the fill pattern 408 correspond to an array "available-fill-patterns" 1103 in the JSON data illustrated in FIG. 11.

Moreover, the 3D printer output setting screen 400 includes an output button 409. When the output button 409 is pressed/selected, the slicer/driver 301 converts the 3D model data 303 into the control command 304 executable by the 3D printer 102 based on a setting value selected from the output setting information 302 by a user.

Next, a configuration of the 3D printer 102 is described. The 3D printer 102 includes an engine unit (hardware) 311, the controller unit 312, and a 3D printer control application 313. A hardware configuration of the engine unit 311 varies depending on a creation method employed by the 3D printer 102. For example, if FDM (i.e., creation method is thermal dissolution laminating method) is employed, the engine unit 311 includes a motor for driving a print head or a stage print head in x, y, and z-axis directions, a heater for heating a nozzle of the print head, and a fan for cooling the nozzle.

The controller unit 312 includes a computer that is built in the 3D printer 102. In comparison with a general-purpose computer, the built-in computer does not have unnecessary functions, performance capabilities, or components to specialize in necessary functions. A manufacturing cost of the built-in computer is lower than that of the general-purpose computer. The controller unit 312 may include a general-purpose computer depending on functions and/or performance capabilities desired by the 3D printer 102. The controller unit 312 includes, for example, a hardware configuration as illustrated in FIG. 2.

The 3D printer control application 313 is executed on the controller unit 312. More specifically, the 3D printer control application 313 is mounted as software in the controller unit 312, and functions when the CPU 203 of the controller unit 312 executes a program stored in the ROM 204.

The 3D printer control application 313 includes a user interface (UI) 314, an application program interface (API) 315, and an engine control unit 316.

The UI 314 controls a display output and an input from a user. For example, the display output and the input from the user are made via the user interface 201 of the 3D printer 102. The user interface 201 of the 3D printer 102 can be a combination of a low-cost liquid crystal display (LCD) that displays only letters of a few lines and a hardware operation button, or a LCD with a touch panel. A user checks a state of the 3D printer 102 and operates the UI 314 to issue a desired processing command to the 3D printer 102 based on the display contents of the UI 314.

The API 315 accepts transmission and reception of a command and data from the external computers 103 and 104. Each of the external computers 103 and 104 transmits a command to the 3D printer control application 313 via the API 315 to control the 3D printer 102.

The engine control unit 316 operates each unit of the engine unit 311 to output a creation object or execute pre-output processing and/or post-output processing according to the command received via the UI 314 or the API 315 or the command issued by the 3D printer control application 313.

The control command 304 generated by the slicer/driver 301 is transmitted to the 3D printer control application 313 via the network 101 and the API 315. In a case where the 3D printer 102 does not have a network interface, the control command 304 can be transmitted to the 3D printer control application 313 via a storage unit such as a universal serial bus (USB) memory.

In the 3D printer control application 313, the control command 304 is interpreted, and the engine control unit 316 operates each unit of the engine unit 311 to output a creation object according to the output command from the UI 314 or the API 315. Output progress of the creation object or a final result indicating success or failure of the output of the creation object is retained as an output result 317. The slicer/driver 301 acquires the output result 317, so that the computer 103 can also check the output result of the 3D printer 102. Moreover, the 3D printer 102 includes capacity information 318 that indicates capacity of the 3D printer 102.

Figure 12:
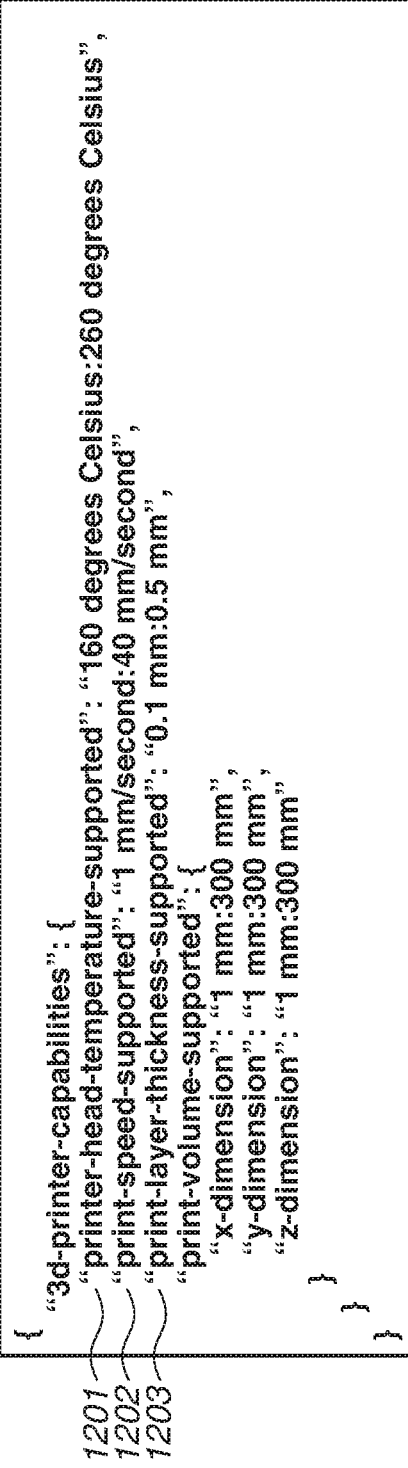
FIG. 12 is a diagram illustrating an example of capacity information in the JSON format.

FIG. 12 is a diagram illustrating an example of the capacity information 318 in the JSON format.

The slicer/driver 301 can acquire the capacity information 318 from the 3D printer 102 selected from the drop-down box 401 on the 3D printer output setting screen 400 illustrated in FIG. 4 to determine whether each of the values set in the up-down boxes 404, 405, and 406 is within a settable range.

The slicer/driver 301 can acquire a lower limit and/or an upper limit of extruder temperature from "printer-head-temperature-supported" 1201 provided in the JSON data illustrated in FIG. 12. Similarly, the slicer/driver 301 can acquire a lower limit and/or an upper limit of print speed from "print-speed-supported" 1202 illustrated in FIG. 12. Similarly, the slicer/driver 301 can acquire a lower limit and/or an upper limit of layer thickness from "print-layer-thickness-supported" 1203 illustrated in FIG. 12. The slicer/driver 301 can determine, based on these acquired lower limits and/or upper limits, whether the values in the respective up-down boxes 404, 405, and 406 on the 3D printer output setting screen 400 illustrated in FIG. 4 are setting values within the printer capacity.

Next, a configuration of the computer 104 is described. The computer 104 includes a 3D printer management application 321, a device list 322, job history data 323, a use state report 324, a simulation screen 325, and an output setting feedback screen 326. The 3D printer management application 321 is executed on the computer 104. Thus, the 3D printer management application 321 is mounted as software in the computer 104, and functions when the CPU 203 of the computer 104 executes a program stored in the secondary storage apparatus 206.

The device list 322 includes data indicating a list of target devices to be managed by the 3D printer management application 321.

The job history data 323 indicates history of jobs. In the job history data 323, the output result 317 acquired from the 3D printer 102 and the execution result 305 acquired (collected) from the computer 103 are stored on an output job basis.

The use state report 324 (e.g., described below with reference to FIG. 5) is displayed and/or output by the 3D printer management application 321. The simulation screen 325 (e.g., described below with reference to FIGS. 6 and 9) is displayed by the 3D printer management application 321. The output setting feedback screen 326 (e.g., described below with reference to FIG. 8) is displayed by the 3D printer management application 321.

FIG. 13 is a diagram illustrating an example of the device list 322 in the JSON format.

The 3D printer management application 321 can acquire unique identification (ID) provided on an individual device basis from the 3D printer 102. This enables the 3D printer management application 321 to identify and/or distinguish the acquired ID as "device-serial-id" 1301 and 1302 in the JSON data illustrated in FIG. 13. Thus, the 3D printer management application 321 can identify and/or aggregate the acquired data on an individual device basis even if a plurality of management targets with the same models is present.

The 3D printer management application 321 acquires not only the output result 317 from the 3D printer 102 serving as the management target device, but also the execution result 305 from the computer 103 constantly (e.g., during a job execution), regularly, or based on a predetermined schedule. The 3D printer management application 321 stores the acquired output results 317 and execution result 305 in the job history data 323. The job execution history (e.g., the output result 317 of the 3D printer 102 or the execution result 305 of the computer 103) may be acquired at regular timing. Alternatively, the job execution history may be acquired at other timing at which, for example, the job is executed, or timing based on a schedule set in advance. The 3D printer 102 and the computer 103 respectively transmit the output result 317 and the execution result 305 to the 3D printer management application 321 at a predetermined timing, and the 3D printer management application 321 receives the output result 317 and the execution result 305. Accordingly, the 3D printer management application 321 can collect the execution history of the jobs executed by the 3D printer 102. In a case where the 3D printer 102 does not include a network interface, the output result 317 can be acquired via the computer 103. Moreover, the output result 317 can be input to the computer 104 via a storage unit such as a USB memory.

FIG. 14 is a diagram illustrating an example of a record of the job history data 323 in the JSON format. Hereinafter, each of items within the JSON data of the job history data 323 is described.

The 3D printer management application 321 identifies which history data belongs to which device individual, based on an item "device-serial-id" 1401 in the JASON data illustrated in FIG. 14. An item "job-id" 1402 indicates ID that separately identifies each of jobs within the same device. Items "job-start-datetime" 1403 and "job-end-datetime" 1404 respectively represent a starting date and time of the job, and an ending date and time of the job. An item "job-name" 1405 represents a job name.

An array "print-objects" 1406 indicates an output target object. The array "print-objects" 1406 includes information of the object output by the job. Items "model-file" 1406a, "number-of-objects" 1406b, and "length" 1406c are stored as the information of the object. The item "model-file" 1406a indicates an original 3D model file name, whereas the item "number-of-objects" 1406b indicates the number of objects. The item "length" 1406c indicates lengths in x, y, and z-axis directions ("x-axis, y-axis, z-axis").

In an item "job-control-file-name" 1407, a file name of a control command is provided. An item "job-exit-code" 1408 contains "code" and "descriptions" in which a job exit code (e.g., "0") and description thereof (e.g., "Success") are respectively provided.

In an item "extruder-temperature" 1409, an extruder temperature at the time of use is provided. In items "print-speed" 1410 and "print-layer-thickness" 1411, a print speed and a layer thickness that have been used are respectively provided. In items "print-fill-density" 1412 and "print-fill-pattern" 1413, output setting values of a fill rate and a fill pattern that have been used are respectively provided.

In an array "materials" 1414, a name (material-name), a type (material-type), color (material-color), a diameter (material-diameter), and a fed length (material-feed-length) of a material used in the job are provided. If an amount of the material used is determined in volume, the diameter and the fed length of the material can be used to calculate the volume.

In an item "power-consumption" 1415, an amount of the power consumed (a power consumption amount) by execution of the job is provided. The power consumption amount can desirably be measured and acquired by the 3D printer 102. However, the 3D printer 102 may not be capable of measuring or acquiring a power consumption amount. In such a case, a power consumption amount can be calculated by an alternative simple method. For example, since a starting date and time and an ending date and time of the job are known, a power consumption amount is calculated based on an average power consumption per unit time on a 3D printer model basis. Alternatively, a power consumption amount of the job may be calculated from a drive distance of a motor, a temperature of a head or a heater, and/or a rotation speed of a fan according to the control command 304 based on a power consumption amount used for operation of the motor, the heater, and the fan on a 3D printer model basis. The calculation of the power consumption amount is not limited thereto. Other methods may be used.

Hereinafter, a 3D printer use state report is described with reference to FIGS. 5 and 15.

Figure 5:
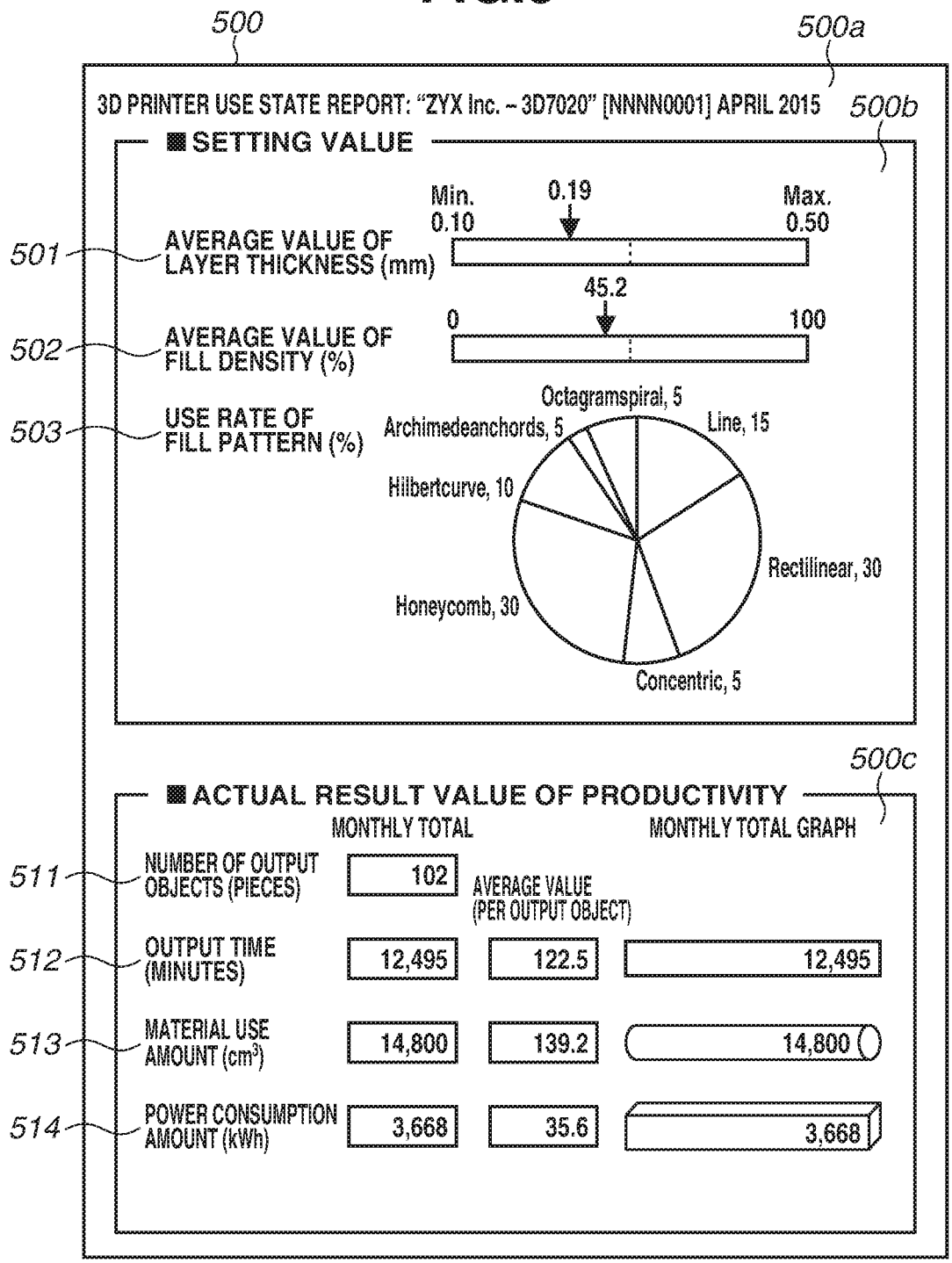
FIG. 5 is a diagram illustrating a 3D printer use state report screen.

FIG. 5 is a diagram illustrating an example of a 3D printer use state report screen 500.

FIG. 15 is a diagram illustrating a data example of the use state report 324 in the JSON format.

For example, the 3D printer use state report screen 500 illustrated in FIG. 5 is displayed on the user interface 201 of the computer 104 by the 3D printer management application 321 according to an instruction from the user interface 201 of the computer 104.

In FIG. 5, the 3D printer use state report screen 500 includes a report title field 500a, a "setting value" field 500b, and an "actual result value of productivity" field 500c. The report title field 500a indicates an aggregate target device and an aggregate target year and month of the report. The report title field 500a corresponds to "device-serial-id" 1501, "manufacturer-name" 1502, "model-name" 1503, and "year-month" 1504 in the JSON data illustrated in FIG. 15.

In the "setting value" field 500b, actual results of use of setting values are reported in three items 501, 502, and 503. The item 501 corresponds to "average-layer-thickness" 1505 in the JSON data illustrated in FIG. 15, and indicates an average value of layer thickness that have been used. The item 502 corresponds to "average-fill-density" 1506 in the JSON data, and indicates an average value of fill density that has been used. The item 503 corresponds to an array "used-fill-patterns" 1507 in the JSON data, and indicates a rate of a fill pattern that has been used.

Although there are various setting values in 3D printer output settings, the three setting values in the items 501 through 503 are mandatory for the slicer/driver 301. The three setting values in the items 501 through 503 are specific to the 3D printer and markedly influence an output time, a material use amount, and a power consumption amount.

The average value of layer thickness in the item 501 takes a weighted average since there is a difference in a material use amount. Hence, the average value of layer thickness is calculated by Expression 1.

$$\overline{L} = \frac{\sum_{i=1}^{n}(L_i \times M_i)}{\sum_{i=1}^{n} M_i} \quad \text{[Expression 1]}$$

where L is a layer thickness, and M is a material use amount.

The average value of fill-density in the item 502 takes a weighted average since there is a difference in 3D model volume. Hence, the average value of fill-density is calculated by Expression 2.

$$\overline{D} = \frac{\sum_{i=1}^{n}(D_i \times V_i)}{\sum_{i=1}^{n} V_i} \quad \text{[Expression 2]}$$

wherein D is a fill density and V is a 3D model volume.

In the "actual result value of productivity" field 500c, four items 511, 512, 513, and 514 are reported as actual result values relating to productivity according to the setting shown in field 500b. The item 511 represents an actual result value of the number of output objects, and corresponds to "number-of-output-objects" 1508 provided in the JSON data illustrated in FIG. 15. The item 511 indicates the total number of output objects. The item 512 represents an actual result value of an output time, and corresponds to "output-time" 1509 in the JSON data. The item 512 indicates total and average values of the output time. The item 513 represents an actual value of a material use amount, and corresponds to "consumed-material-volume" 1510 in the JSON data. The item 513 indicates total and average values of the material used. The item 514 represents an actual value of a power consumption amount, and corresponds to "power-consumption" 1511 in the JSON data. The item 514 indicates total and average values of the power consumption amount.

The 3D printer management application 321 aggregates collected records of the job history data 323 on an aggregate target device basis and an aggregate target year and month basis to determine aggregate values of the setting values in the items 501, 502, and 503 and the values in the items 511 through 514.

The use of the 3D printer use state report illustrated in FIG. 5 enables an actual result of use of the 3D printer and an actual result relating to resources and productivity of the 3D printer to be appropriately reported in consideration of characteristics of the 3D printer and differences with a 2D printer.

Hereinafter, processing for outputting a 3D printer productivity simulation result by a 3D printer management application is described with reference to FIGS. 6 and 7.

Figure 6:
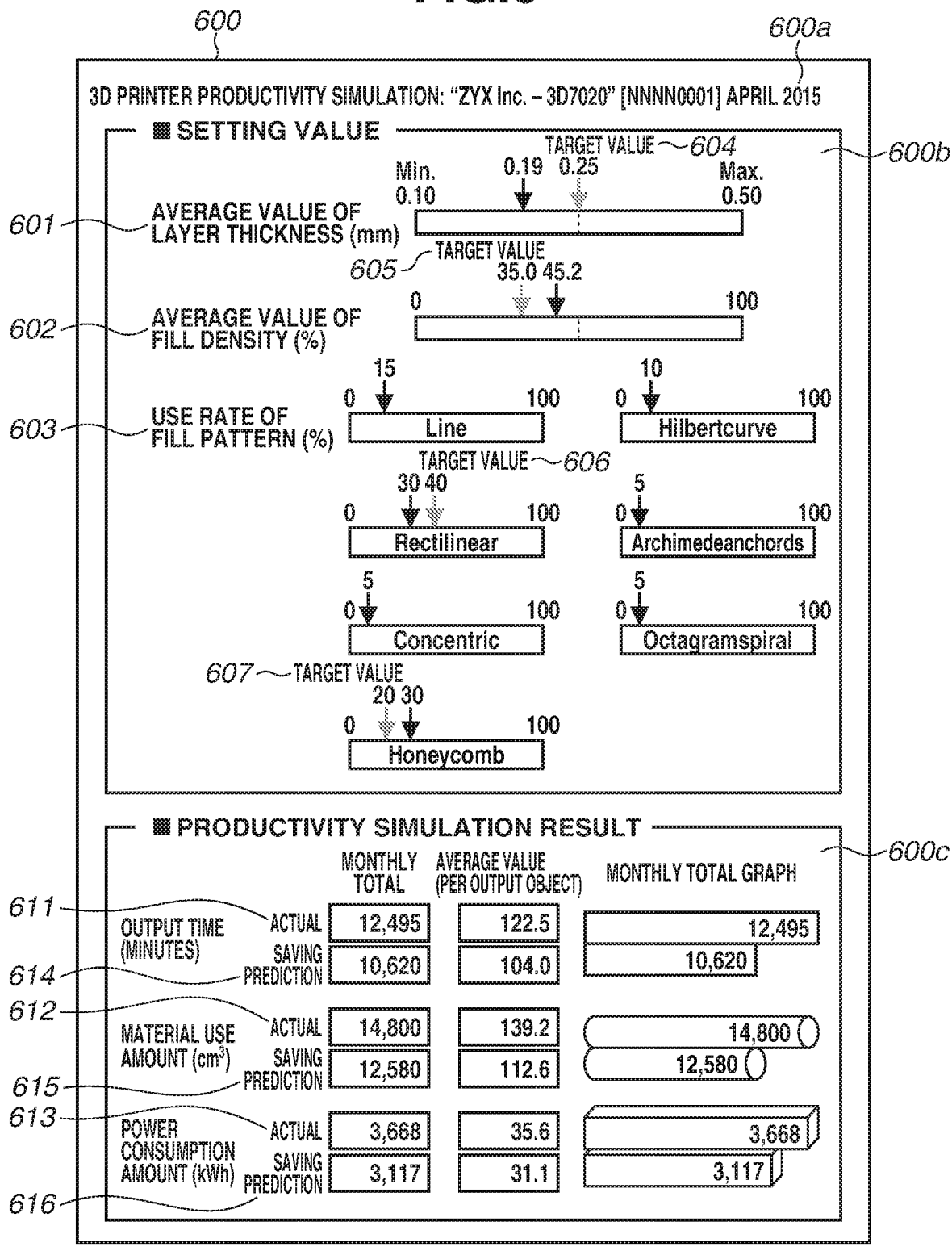
FIG. 6 is a diagram illustrating a 3D printer productivity simulation screen.

FIG. 6 illustrates a 3D printer productivity simulation screen 600 corresponding to the simulation screen 325 illustrated in FIG. 3.

The use of the 3D printer productivity simulation screen 600 enables a target value of a 3D printer output setting value to be defined with respect to the 3D printer use state report screen 500, and a productivity simulation result to be output with respect to a changed target value.

In FIG. 6, the 3D printer productivity simulation screen 600 includes a title field 600a, a "setting value" field 600b, and a "productivity simulation result" field 600c. The title field 600a indicates an aggregate target device and an aggregate target year and month of the report as similar to the report title field 500a illustrated in FIG. 5.

In the "setting value" field 600b, three items 601, 602, and 603 are displayed as similar to the items 501, 502, and 503 illustrated in FIG. 5.

Moreover, in the "setting value" field 600b, target values 604, 605, 606, and 607 are displayed. The target value 604 is set with respect to an average value of layer thickness. The target value 605 is set with respect to an average value of fill density. Each of the target values 606 and 607 is set with respect to a use rate of fill pattern. As for each of the target values, a value that is the same as the actual result value is set as an initial value, and the initial value is displayed by being overlaid on an arrow indicating the actual result value. When each of the target values 604 through 607 is to be changed, the corresponding arrow is moved with a mouse, for example. As for the average value of layer thickness in the item 601, although an initial target value was "0.19", a user has used, for example, a mouse to change a target value to "0.25" as indicated by the target value 604. The change of the target value is not limited thereto. Any other methods can be used. When the target value is changed, a value in the "productivity simulation result" field 600c is also changed as described below according to the change of the target value.

In the "productivity simulation result" field 600c, items 611, 612, and 613 of actual result values respectively indicating an output time, a material use amount, and a power consumption amount are displayed as similar to the items 512, 513, and 514 illustrated in FIG. 5. Moreover, items 614, 615, and 616 are displayed as simulation results with respect to the set target values. The items 614, 615, and 616 respectively indicate a saving prediction about output time (an efficiency prediction), a saving prediction about a material use amount, and a saving prediction about power consumption amount.

Processing for simulating the saving predictions about output time, a material use amount, and a power consumption amount is described with reference to the flowchart illustrated in FIG. 7.

Figure 7:
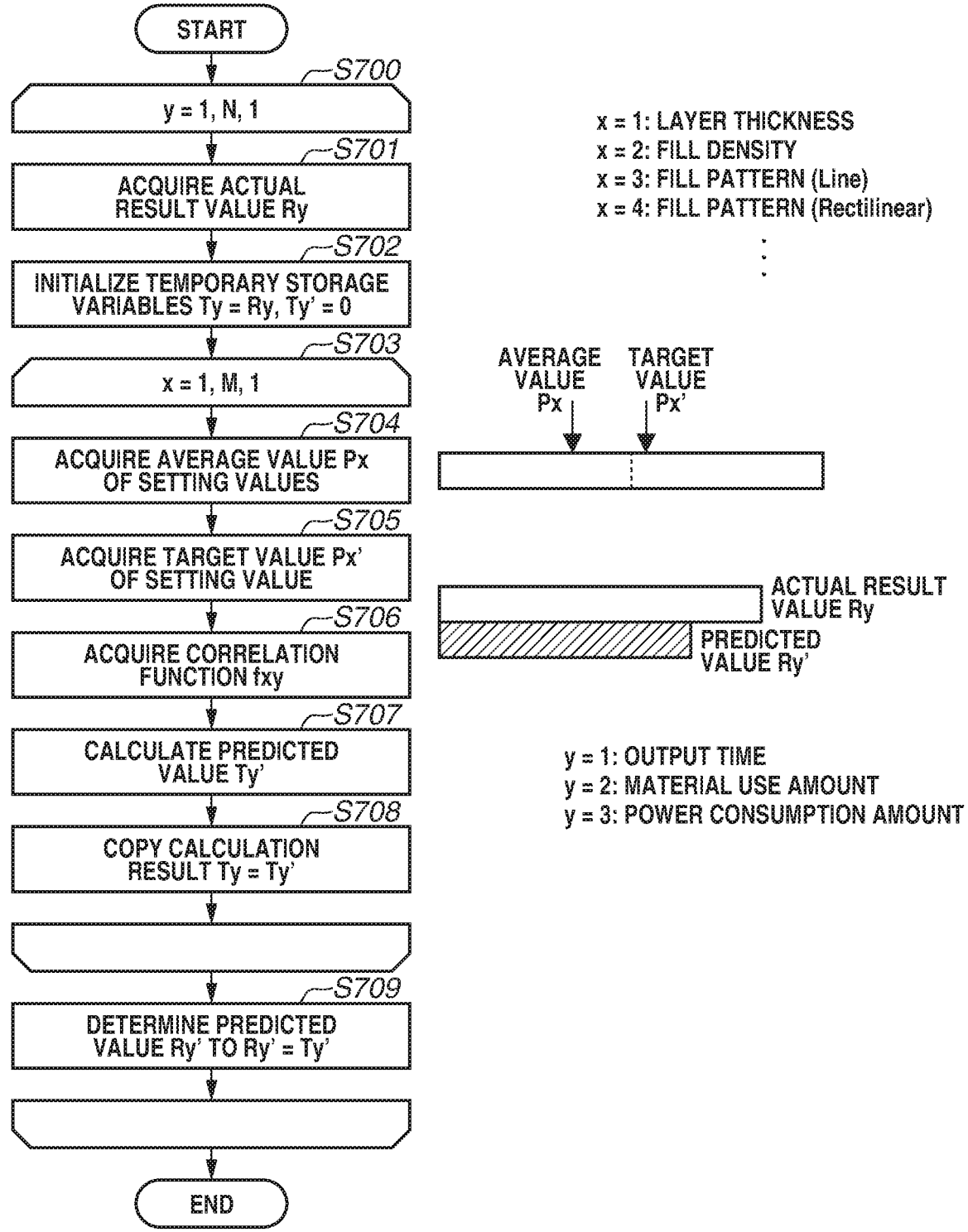
FIG. 7 is a flowchart illustrating processing for calculating a 3D printer productivity simulation result.

FIG. 7 is a flowchart illustrating example processing for calculating a productivity simulation result (the saving predictions about output time, a material use amount, and power consumption amount). The processing of the flowchart illustrated in FIG. 7 is performed by executing a program stored in the secondary storage apparatus 206 by the CPU 203 of the computer 104. Such processing is executed when the 3D printer productivity simulation screen 600 illustrated in FIG. 6 is displayed, and when a target value is changed.

In the description of the flowchart illustrated in FIG. 7, an average value and a target value of 3D printer output setting values are respectively set to $P_x$ and $P_x'$. Moreover, if x=1, it represents "layer thickness". If x=2, it represents "fill density". Moreover, if x=3 or more, it represents a use rate of each fill pattern, for example, line, rectilinear, or the like. An actual result value of productivity is set to $R_y$, whereas a predicted value of productivity is set to $R_y'$. If y=1, y=2, and y=3, they respectively represent "output time", "material use amount", and "power consumption amount".

In step S700, the 3D printer management application 321 controls operation so that processing in steps S701 through S709 is executed from y=1 until y=N (N=3 in the present exemplary embodiment).

In step S701, the 3D printer management application 321 acquires an actual result value $R_y$.

In step S702, the 3D printer management application 321 initializes temporary storage variables $T_y$ and $T_y'$ into Ry and 0, respectively.

In step S703, the 3D printer management application 321 controls operation so that processing in steps S704 through S708 is executed from x=1 until x=M (e.g., M=9 if there are 7 types of settable fill patterns).

In step S704, the 3D printer management application 321 acquires an average value $P_x$ of setting values.

Subsequently, in step S705, the 3D printer management application 321 acquires a target value $P_x'$ of the setting value.

In step S706, the 3D printer management application 321 acquires a correlation function $f_{xy}$ that indicates a correlation between fluctuations in the setting value $P_x$ and fluctuations in the actual result value $R_y$. The correlation function $f_{xy}$ is determined on a 3D printer model basis or a 3D printer individual basis, so that a predicted value can be calculated using the correlation function $f_{xy}$.

In the 3D printer, for example, a layer thickness may be set to a larger value. In such a case, a resolution of a creation object is lowered, whereas an output time is shortened. Moreover, the shorter the output time, the lower the power consumption amount. However, even if the output time is shortened, a material use amount remains almost constant. Moreover, for example, a fill density may be set to a smaller value. In such a case, a volume of material to be used in an internal structure of a creation object is reduced. Accordingly, a time needed for an internal structure portion to be output is shorter, and thus an output time is shortened. Moreover, the shorter the output time, the lower the power consumption amount. As for the fill pattern, the following changes occur depending on which fill pattern is used. First, since a material use amount depends only on a fill density, the material use amount is not changed by a fill pattern. If a fill pattern is generated by a liner operation, an output speed is relatively high. A fill pattern may be generated in complicated shape. In such a case, although strong structure can be created, an output speed is low. Since the output speed directly links to the output time, a power consumption amount changes with the output time.

Thus, the 3D printer has such characteristics, and a correlation between fluctuations in a setting value and fluctuations in an actual result value differs depending on a 3D printer model or a 3D printer individual. Therefore, for example, fluctuations in an actual result value with respect to fluctuations in a setting value may be measured for each 3D printer model (or for each 3D printer individual), so that the above correlation function $f_{xy}$ can be determined based on the measurement result. The method for determining the correlation function $f_{xy}$ is not limited thereto. Any method can be used.

In step S707, the 3D printer management application 321 uses the correlation function $f_{xy}$ acquired in step S706 to determine a predicted value $T_y'$ by Expression 3.

$$T_y' = T_y \times \left(1 - f_{xy}\left(\frac{P_x - P_x'}{P_x}\right)\right) \qquad \text{[Expression 3]}$$

In step S708, the 3D printer management application 321 substitutes the result calculated in step S707 into the temporary storage variable $T_y$ and copies the result.

Upon completion of the processing in step S708, the 3D printer management application 321 determines whether the processing in steps S704 through step S708 for x=1 to x=M (M=9 in the above example) has been completed. If the 3D printer management application 321 determines that the processing in steps S704 through step S708 for x=1 to x=M has not been completed, the 3D printer management application 321 increments x by "1", and executes the processing in steps S704 through S708.

On the other hand, if the 3D printer management application 321 determines that the processing in step S704 through step S708 for x=1 to x=M has been completed, the processing exits from the loop in step S703 and proceeds to step S709.

In step S709, the 3D printer management application 321 determines a predicted value $R_y'$. The predicted value $R_y'$ determined in step S709 is displayed as the items 614, 615, and 616 indicating saving predicted values on the 3D printer productivity simulation screen 600.

When the processing in step S709 is completed, the 3D printer management application 321 determines whether the processing in steps S701 through S709 for y=1 to y=N (N=3 in the present exemplary embodiment) has been completed. If the 3D printer management application 321 determines that the processing in steps S701 through S709 for y=1 to y=N has not been completed, the 3D printer management application 321 increments y by "1" and executes the processing in steps S701 through S709.

On the other hand, if the 3D printer management application 321 determines that the processing in steps S701 through S709 for y=1 to y=N has been completed, the processing exits from the loop in step S700 and the 3D printer management application 321 ends the processing of the flowchart.

With such processing, a result of the simulation how the item relating to the productivity changes with respect to a change in the 3D printer output setting value can be acquired (a saving prediction about an item relating to productivity is simulated according to a setting change). Accordingly, the simulation result can be displayed as illustrated in FIG. 6, for example.

Next, a method for feeding back a target value to the output setting information 302 of the slicer/driver 301 based on the simulation result is described with reference to FIG. 8.

FIG. 8 illustrates a feedback setting screen 800 with respect to an output profile.

The feedback setting screen 800 corresponds to the output setting feedback screen 326 illustrated in FIG. 3, and includes a radio button 801, controls 802 and 803, and a setting button 804. Such a screen 800 is displayed, for example, on the user interface 201 of the computer 104 by the 3D printer management application 321 according to an instruction from the user interface 201 of the computer 104.

The radio button 801 is used to select a target profile with respect to an output setting that is to be fed back.

The control 802 is used to set a change amount of a default value with respect to a layer thickness and a fill density of the profile selected using the radio button 801. In the 3D printer, since a large change in output setting value can degrade the quality of a creation object or cause an output failure, a change amount can be selected from "Defensive", "Middle", and "Aggressive".

The control 803 is used to change default options and an arrangement order of fill pattern options.

The setting button 804 is used to reflect feedback contents in the output setting information 302. More specifically, when the setting button 804 is pressed, the feedback contents set in FIG. 8 is transmitted from the 3D printer management application 321 of the computer 104 to the computer 103. Then, the output setting information 302 is updated with the feedback contents. When the setting button 804 is pressed, the feedback content set in FIG. 8 may be exported into the secondary storage apparatus 206 of the computer 104. In such a case, the exported file is imported to the computer 103, so that the output setting information 302 is updated.

In the above example, the change amount of the default value in the control 802 is fixed or set beforehand by a user, and is not a reflection of the simulation result illustrated in FIG. 6. However, the simulation result illustrated in FIG. 6 may be reflected in the change amount of the default value in the control 802. For example, a user may input a simulation result feedback instruction. In such a case, the 3D printer management application 321 may set a target value (e.g., the target values 604 through 607 illustrated in FIG. 6) designated on the 3D printer productivity simulation screen 600 to the change amount of "Middle" in the control 802 such that the feedback setting screen 800 is displayed. A change amount of each of "Defensive" and "Aggressive" is calculated from a change amount of "Middle". The arrangement order of fill pattern options in the control 803 illustrated in FIG. 8 may be set in descending order of target values of the fill pattern use rates in the item 603 illustrated in FIG. 6, or the option having the largest target value can be set to a default option.

Accordingly, the feedback contents are reflected in the output setting information 302. Subsequently, the output setting information 302 is read from the slicer/driver 301, so that a default setting value, a default option, and a fill pattern arrangement order of the setting values in the respective output profiles on the 3D printer output setting screen 400 are changed. This method enables the user to check the target values and the productivity simulation result set on the 3D printer productivity simulation screen 600, and to change the default setting value and the option in the output setting information 302 of the slicer/driver 301.

Next, processing for determining productivity and saving effect simulation results according to multiple-object arrangement of 3D printer is described with reference to FIGS. 9 and 10.

Figure 9:
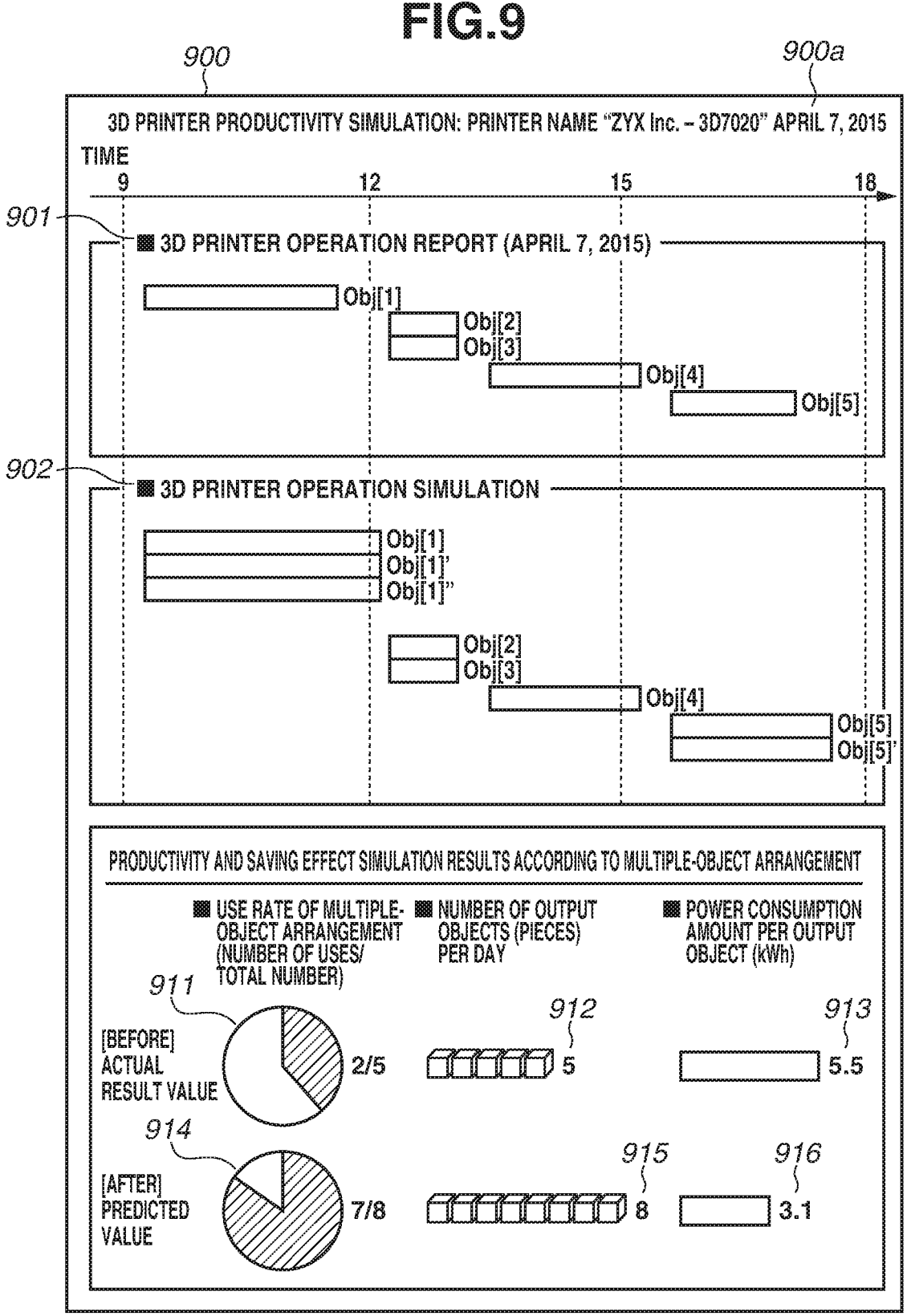
FIG. 9 is a diagram illustrating a 3D printer productivity simulation screen according to multiple-object arrangement.

FIG. 9 illustrates a productivity simulation screen 900 according to multiple-object arrangement in the 3D printer management application 321. The screen 900 is, for example, displayed on the user interface 201 of the computer 104 by the 3D printer management application 321 according to an instruction from the user interface 201 of the computer 104.

In FIG. 9, the productivity simulation screen 900 includes a 3D printer operation report 901 with a designated date (900a) of the printer, and a 3D printer operation simulation result 902.

The JSON data example of the job history data 323 illustrated in FIG. 14 is history data when one object is output per job. However, the 3D printer can output a plurality of objects in one output job in a case where the objects can be arranged within a range of outputtable lengths in x, y, and z-axis directions of the 3D printer.

FIG. 16 is a diagram illustrating an example of one record of the job history data 323 in the JSON format in a case where a plurality of objects are output in one output job.

Differences between the JSON data example acquired in a case where one object is output per job illustrated in FIG. 14 and the JSON data example illustrated in FIG. 16 are as follows. As illustrated in FIG. 16, contents 1601 and 1602 indicate that a plurality of different objects is stored in "print-objects". Moreover, "number-of-objects" 1603 indicates that a value of 2 or greater is stored as the number of objects. In the example illustrated in FIG. 16, since the "number-of-objects" 1603 indicates "2", two objects indicated by the content 1601 are to be rendered (the same two objects are to be rendered). Among records of the job history data 323, a record with or without multiple-object arrangement can be determined based on the number of arrays in the "print-objects" or a value in the "number-of-objects" 1603.

In FIG. 9, items 911, 912, and 913 respectively indicate actual result values of a use rate of multiple-object arrangement at a specific date, the number of output objects per day, and a power consumption amount per output object. Each of the actual result values is generated by the 3D printer management application 321 based on the job history data 323. The actual result values are described with reference to FIG. 17.

FIG. 17 illustrates the actual result values in the JSON format.

According to an array "jobs" 1701 and an array "print-objects" 1702 in the JSON data illustrated in FIG. 17, an output-time graph in the 3D printer operation report 901 illustrated in FIG. 9 is output.

Moreover, according to "number-of-output-objects" (1703 and 1704) in the JSON data illustrated in FIG. 17, a use rate of multiple-object arrangement (1704/1703) of the item 911 illustrated in FIG. 9, and the number of objects (1703) of the item 912 illustrated in FIG. 9 are output. According to "power-consumption" (1705, 1706) in the JSON data illustrated in FIG. 17, a power consumption amount of the item 913 illustrated in FIG. 9 is output.

Since the 3D printer consumes a longer output time per job, the number of objects should be output as many as possible in one job to enhance usage efficiency of the 3D printer. Accordingly, when the multiple-object arrangement is used, the 3D printer operation simulation result 902 illustrated in FIG. 9 is displayed.

Moreover, in FIG. 9, items 914, 915, and 916 respectively indicate predicted values of a use rate of multiple-object arrangement if maximum multiple-object arrangement is used, the number of output objects per day, and a power consumption amount per output object.

Processing for determining a 3D printer productivity simulation result in a case where multiple-object arrangement is used is described with reference to a flowchart illustrated in FIG. 10.

Figure 10:
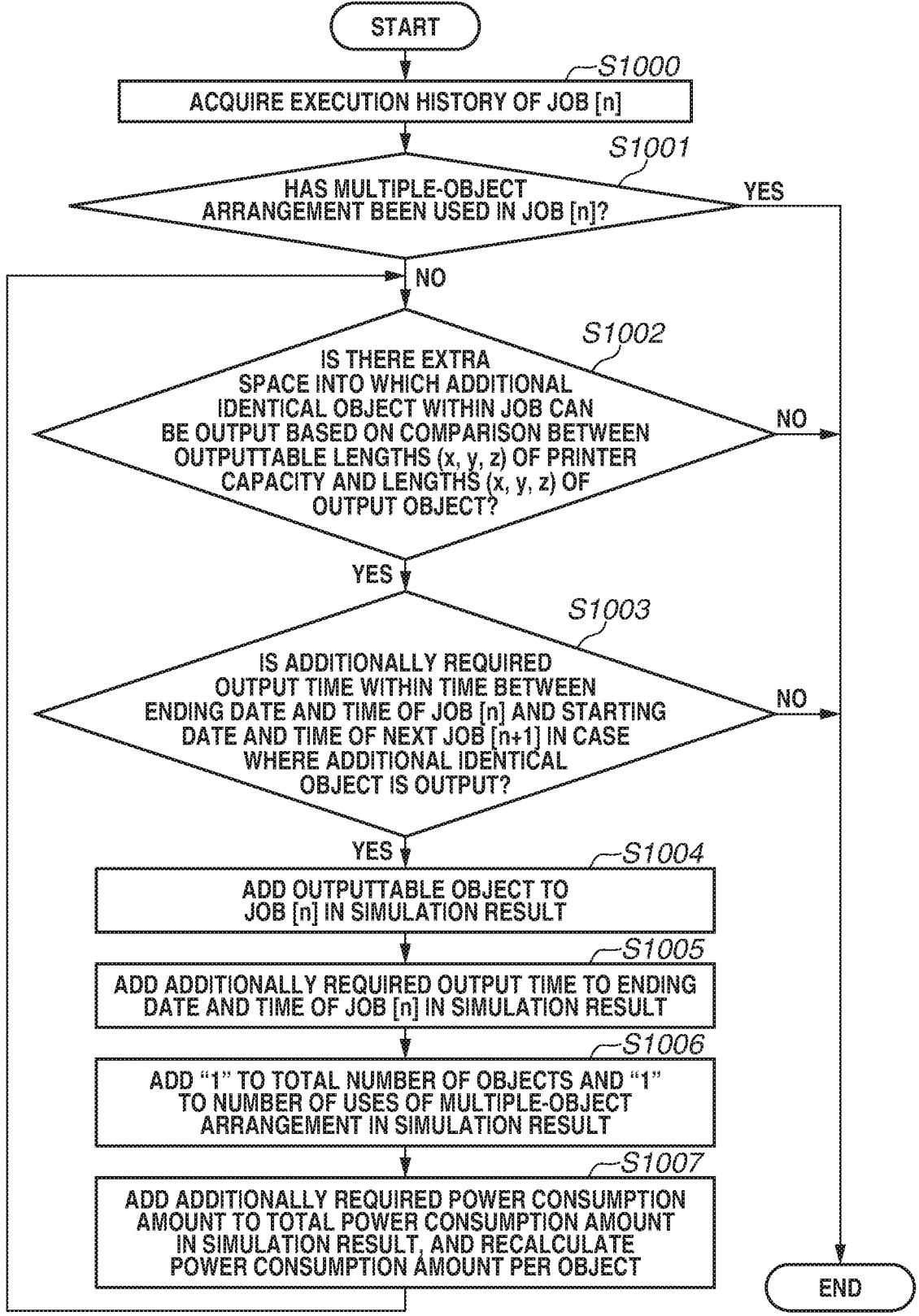
FIG. 10 is a flowchart illustrating processing for calculating a 3D printer productivity simulation result according to the multiple-object arrangement.

FIG. 10 is a flowchart illustrating an example of processing for calculating a 3D printer productivity simulation result according to multiple-object arrangement. The productivity simulation includes an operation simulation, and a productivity and saving effect simulation. The processing of the flowchart illustrated in FIG. 10 is performed by executing a program stored in the secondary storage apparatus 206 by the CPU 203 of the computer 104. When the productivity simulation screen 900 illustrated in FIG. 9 is displayed, such processing is executed with respect to each job [n] of the array "jobs" 1701 provided in actual result value data in the JSON format illustrated in FIG. 17.

In step S1000, the 3D printer management application 321 acquires execution history of a job [n] from the array "jobs" 1701 in the actual result value data in the JSON format illustrated in FIG. 17.

In step S1001, the 3D printer management application 321 determines whether multiple-object arrangement has been used in the job [n] acquired in step S1000. If the 3D printer management application 321 determines that the multiple-object arrangement is already used in the job [n] (YES in step S1000), the 3D printer management application 321 ends the processing of the flowchart.

On the other hand, if the 3D printer management application 321 determines that the multiple-object arrangement is not used in the job [n] (NO in step S1000), the processing proceeds to step S1002.

In step S1002, the 3D printer management application 321 compares outputtable lengths in x, y, and z-axis directions of 3D printer capacity with lengths in x, y, and z-axis directions of an output object within the job [n] to determine whether there is extra space into which an additional identical object can be output. The outputtable lengths in the x, y, and z-axis directions of the 3D printer capacity can be acquired from "print-volume-supported" within the JSON data of the capacity information 318.

If the 3D printer management application 321 determines that there is no extra space into which an additional identical object can be output (NO in step S1002), the 3D printer management application 321 ends the processing of the flowchart.

On the other hand, if the 3D printer management application 321 determines that there is extra space into which an additional identical object can be output (YES in step S1002), the processing proceeds to step S1003.

In a case where an additional identical object is output, an increase in the number of objects prolongs the entire output time due to an increase in a drive distance of a print head. Therefore, in step S1003, if the additional identical object is output, the 3D printer management application 321 determines whether an additional output time is within time between an ending date and time of the job [n] and a starting date and time of a next job [n+1].

The additional time to output the additional identical object can be determined, for example, by adding a print head movement time between objects to a time needed from the beginning to the end of output of the identical object. The print head movement time between objects represents a time period during which the print head is moved between the objects without extruding a material, and can be calculated from a movement distance and a movement speed. Moreover, the print head needs to be moved between the objects one time with respect to one lamination in the z-axis direction.

When a 3D object is output, a large part of the output time is consumed by outputting an outer shell or an internal structure of the 3D object. Therefore, the time used to move the head without extruding the material can be disregarded in approximate calculation. When a plurality of objects is arranged in one job, a print head warm-up time prior to the beginning of output of the objects is only needed one time. Thus, such a warm-up time does not need to be added for each object.

The job history data of the present exemplary embodiment includes not only the starting date and time and the ending date and time of each job, but also a starting date and time and an ending date and time of each object (not illustrated). With the starting date and time and the ending date and time of each object, the 3D printer management application 321 calculates the additional output time, which is used if the additional identical object is output. The 3D printer management application 321 may be able to acquire a control command to an object that has been already output.

In such a case, the 3D printer management application 321 may determine a movement amount (distance) and a movement speed of the print head based on the control command to such an output object. Then, the 3D printer management application 321 can use the determined movement distance and speed to calculate the additional output time, which is used if the additional identical object is output. Alternatively, the 3D printer management application 321 may measure an increase rate of output time with respect to each 3D printer model (or each 3D printer) in advance, the increase rate being provided if an additional identical object is output within a job. In such a case, the 3D printer management application 321 may use an average value of the measurement results to determine the additional output time, which is used if the additional identical object is output. In these cases, the job history data may not necessarily include the above-described starting date and time and the ending date and time of each object. Further, other methods may be used to determine the additional output time, which is used if the additional identical object is output.

If the 3D printer management application 321 determines that the additional output time is not within the time between the ending date and time of the job [n] and the starting date and time of a next job [n+1] (NO in step S1003), the 3D printer management application 321 ends the processing of the flowchart.

On the other hand, if the 3D printer management application 321 determines that the additional output time is within the time between the ending date and time of the job [n] and the starting date and time of a next job [n+1] (YES in step S1003), the processing proceeds to step S1004.

In step S1004, the 3D printer management application 321 adds an outputtable object to the job [n] in the simulation result. In this processing, a value of "1" is added to a value of "number-of-objects" of the array "print-objects" (e.g., "print-objects" 1702 in FIG. 17) in an n-th array within the array "jobs" in the actual result value data in the JSON format described above.

Subsequently, in step S1005, the 3D printer management application 321 adds the additional output time to the ending date and time of the job [n] in the simulation result. This corresponds to the processing for adding the additional output time to "job-end-datetime" within an n-th array within the array "jobs" in the actual result value data in the JSON format described above.

In step S1006, the 3D printer management application 321 adds a value of "1" to the total number of objects (e.g., "total" 1703 illustrated in FIG. 17) of the job [n] in the simulation result, and a value of "1" to the number of uses of multiple-object arrangement (e.g., "applied-multiple-objects" 1704 illustrated in FIG. 17). This corresponds to the processing for adding a value of "1" to "total" 1703 and a value of "1" to "applied-multiple-objects" 1704 of "number-of-output-objects" in the actual result data in the JSON format described above. However, when the 3D printer management application 321 first determines that an additional object can be arranged, a value of "2" is added to the number of uses of multiple-object arrangement ("applied-multiple-objects" 1704 illustrated in FIG. 17) in step S1007.

In step S1007, the 3D printer management application 321 adds an additional power consumption amount to a total power consumption amount (e.g., "total" 1705 illustrated in FIG. 17) in the job [n] in the simulation result, and recalculates a power consumption amount (e.g., "average" 1706 illustrated in FIG. 17) per object based on the total number of objects newly determined in step S1006. The processing in step S1007 corresponds to processing for adding an additional power consumption amount to "total" 1705 of "power-consumption" in the actual result value data in the JSON format described above, and to processing for updating "average" 1706 of the "power-consumption" with the recalculated result.

After the 3D printer management application 321 executes the processing in step S1007, the processing returns to step S1002, so that the 3D printer management application 321 determines whether there is extra time and space into which an identical object can be further added. If the 3D printer management application 321 determines that there are extra time and space, the processing in steps S1002 through S1007 is executed to add the identical object. If the 3D printer management application 321 determines that "NO" in any of steps S1002 and S1003, the 3D printer management application 321 ends the processing for the job [n].

According to the processing performed in steps S1002 and S1003 of the flowchart illustrated in FIG. 10, a saving effect of at least one of productivity and power consumption can be simulated for each job in a case where the number of objects identical to an object to be created by the job is increased to maximum within creatable size in the 3D printer. Such a saving effect can also be simulated in a case where the identical objects are added such that the number of identical objects reaches the maximum creatable number before a time at which a next job is started.

The processing illustrated in FIG. 10 has been described using an example case in which the processing with respect to the job [n] ends if multiple-object arrangement has been used in the job [n] (YES in step S1001). However, even if the multiple-object arrangement has been used in the job [n], the processing may proceed to step S1002 and subsequent steps. In such a case, the 3D printer management application 321 may determine whether there is extra space and extra time into which an additional identical object can be output. If the extra space and the extra time are present, the additional identical object may be output.

The 3D printer management application 321 performs the processing illustrated in FIG. 10 with respect to every n of job [n] to acquire results of simulations according to multiple-object arrangement on that date. Then, the 3D printer management application 321 outputs the acquired simulation results as an output time graph in the operation simulation result 902 and predicted values in the items 914, 915, and 916 illustrated in FIG. 9. The item 914, 915, and 916 respectively indicate the predicted values of a use rate of multiple-object arrangement, the number of output objects per day, and a power consumption amount per output object.

As described above, the 3D printer management application 321 can collect the execution result 305 of the slicer/driver 301 and the output result 317 of the 3D printer 102 and hold the job history data 323. Accordingly, the job history data 323 is aggregated, so that the 3D printer management application 321 can output the use state report 324 (e.g., the 3D printer use state report screen 500) of the 3D printer. Moreover, on the simulation screen 325 (e.g., the 3D printer productivity simulation screens 600 and 900), the 3D printer management application 321 can display a productivity simulation result in a case where a 3D printer output setting value is changed.

Conventionally, in the field of 2D printer serving as a printing machine for printing an image on paper in a planar manner, a printer management application has provided functions of generating a printer operation state report and performing a setting value change simulation. According to present exemplary embodiment, functions similar to those provided by the printer management application in the field of 2D printer can be provided in the field of 3D printer serving as one example of a control apparatus for creating a 3D object based on special model data. Therefore, a 3D printer management application capable of outputting and/or displaying saving effects of items related to resources and productivity in the 3D printer in consideration of characteristics of the 3D printer and differences with the 2D printer can be provided.

In the above-described exemplary embodiment, the software configuration is applied to the 3D printer 102 and the computers 103 and 104 as illustrated in FIG. 3. However, application of the software configuration is not limited to the above-described hardware configurations and arrangement of the 3D printer 102 and the computers 103 and 104. More specifically, each software configuration may be executed on any hardware configuration of the controller unit 312 of the 3D printer 102, the computer 103, and the computer 104. Alternatively, one hardware configuration may execute all software configurations, or a plurality of hardware configurations may respectively execute a software configuration.

Therefore, the 3D printer management application 321 collects an output setting value used when the 3D printer has performed an output operation and an output result of the 3D printer, and outputs a 3D printer use state report and a productivity simulation result. Such configuration enables a simulation to be performed on changes in productivity-related items such as an output time, a material use amount, and a power consumption amount of the 3D printer, the changes being associated with changes in specific output setting values of the 3D printer such as a layer thickness, a fill rate, and a fill pattern. Thus, a simulation for enhancing efficiency such as productivity can be performed based on actual result of use of the 3D printer, so that saving effects of items related to resources and productivity in the 3D printer can be output and/or displayed.

Therefore, there is provided a 3D printer management application capable of not only appropriately simulating saving effects of items related to resources and productivity in the 3D printer based on a 3D printer use state and/or actual productivity result in consideration of characteristics of the 3D printer and differences with the 2D printer, but also outputting and/or displaying a simulation result. With such a 3D printer management application, a 3D printer can be managed in consideration of characteristics of the 3D printer and differences with the 2D printer.

The structures and the contents of various data described above are not limited thereto, and may be configured in various manners according to a purpose and a usage.

Although the present disclosure has been described with reference to one exemplary embodiment, the present disclosure may be embodied in various forms, for example, a system, an apparatus, a method, a program, and a storage medium. Particularly, the present disclosure can be applied to a system including a plurality of apparatuses, or an apparatus configured of a device.

Moreover, the present disclosure includes a combination of each of the exemplary embodiments.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors and one or more memories (e.g., central processing unit (CPU), micro processing unit (MPU), or the like) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-143661, filed Jul. 21, 2015, which is hereby incorporated by reference herein in its entirety.

What is claimed is:

1. A management system for managing a control apparatus configured to execute a job for creating a three-dimensional (3D) object by a creation device, the management system comprising:
a memory storing instructions; and
at least one processor which, when executing the instructions, causes the management system to:
collect execution histories of a plurality of jobs executed by the control apparatus;
aggregate data included in the execution histories corresponding to a target period from among the collected execution histories;
generate, based on a result of aggregation related to the execution histories, a report including an actual result of use of a specific setting for control of 3D object creation and an actual result value relating to productivity for a plurality of objects created according to the specific setting, wherein the actual result value relating to the productivity includes an actual result value of a material use amount;
receive an input of a change of a parameter related to the actual result of the use of the specific setting for control of the 3D object creation;
perform a simulation about how much the actual result value related to the productivity is predicted to change when a setting corresponding to the changed parameter is used as the specific setting of the plurality of jobs corresponding to the execution histories used for the aggregation; and
provide a result of the simulation including both the actual result value of the material use amount and a saving prediction value of the material use amount according to the changed parameter.

2. The management system according to claim 1, wherein the specific setting includes at least one of a setting about a layer thickness, a setting about a fill density, and a setting about a fill pattern.

3. The management system according to claim 1,
wherein the actual result value relating to the productivity further includes an actual result value of an output time, and
wherein the instructions further cause the management system to perform, using the actual result of use of the specific setting and the actual result value relating to the productivity, a simulation of output time efficiency as a prediction according to the changed parameter.

4. The management system according to claim 1,
wherein the actual result value relating to the productivity further includes an actual result value of a power consumption amount; and
wherein the instructions further cause the management system to perform, using the actual result of use of the specific setting and the actual result value relating to the productivity, a simulation of saving effect of the power consumption amount as a prediction according to the changed parameter.

5. The management system according to claim 1, wherein the execution histories are received at a predetermined timing from the control apparatus or an information processing apparatus that executes software for generating the job for creating the 3D object.

6. The management system according to claim 1, wherein the actual result of use of the specific setting indicates an average value of values having been set by the plurality of jobs corresponding to the execution histories used for the aggregation.

7. A control method for a management system for managing a control apparatus configured to execute a job for creating a three-dimensional (3D) object by a creation device, the control method comprising:
collecting execution histories of a plurality of jobs executed by the control apparatus;
aggregating data included in the execution histories corresponding to a target period from among the collected execution histories;
generating, based on a result of aggregation related to the execution histories, a report including an actual result of use of a specific setting for control of 3D object creation and an actual result value relating to productivity for a plurality of objects created according to the specific setting, wherein the actual result value relating to the productivity includes an actual result value of a material use amount;
receiving an input of a change of a parameter related to the actual result of the use of the specific setting for control of the 3D object creation;
performing a simulation about how much the actual result value related to the productivity is predicted to change when a setting corresponding to the changed parameter is used as the specific setting of the plurality of jobs corresponding to the execution histories used for the aggregation; and
providing a result of the simulation including both the actual result value of the material use amount and a saving prediction value of the material use amount according to the changed parameter.

8. A non-transitory computer readable storage medium storing a computer program for causing a computer to execute a method for a management system to manage a control apparatus configured to execute a job for creating a three-dimensional (3D) object by a creation device, the method comprising:

collecting execution histories of a plurality of jobs executed by the control apparatus;

aggregating data included in the execution histories corresponding to a target period from among the collected execution histories;

generating, based on a result of aggregation related to the execution histories, a report including an actual result of use of a specific setting for control of 3D object creation and an actual result value relating to productivity for the plurality of objects created according to the specific setting, wherein the actual result value relating to the productivity includes an actual result value of a material use amount;

receiving an input of a change of a parameter related to the actual result of the use of the specific setting for control of the 3D object creation;

performing a simulation about how much the actual result value related to the productivity is predicted to change when a setting corresponding to the changed parameter is used as the specific setting of the plurality of jobs corresponding to the execution histories used for the aggregation; and providing a result of the simulation including both the actual result value of the material use amount and a saving prediction value of the material use amount according to the changed parameter.

* * * * *